United States Patent
Takeda et al.

[19]

[11] Patent Number: 5,938,598
[45] Date of Patent: Aug. 17, 1999

[54] MAGNETIC FIELD SOURCE MOVABLE PHANTOM HEAD

[75] Inventors: Tsunehiro Takeda; Hiroshi Endo; Toru Kumagai, all of Tsukuba, Japan

[73] Assignee: Director-General of Agency of Industrial Science and Technology, Tokyo, Japan

[21] Appl. No.: 08/816,576

[22] Filed: Mar. 13, 1997

[30] Foreign Application Priority Data

Mar. 18, 1996 [JP] Japan .................................. 8-060637

[51] Int. Cl.⁶ ...................................................... A61B 5/05
[52] U.S. Cl. ........................... 600/409; 600/416; 324/262
[58] Field of Search .................................. 600/409, 372, 600/373, 378, 416, 544; 324/244, 260, 261, 262

[56] References Cited

U.S. PATENT DOCUMENTS 4,411,523  10/1983  Blume et al. .

4,600,487  7/1986  Dahlgren .
5,222,980  6/1993  Gealow .
5,246,000  9/1993  Ellis et al. .
5,307,807  5/1994  Valdes Sosa et al. .
5,595,182  1/1997  Krivitski .
5,706,811  1/1998  Takeda et al. .

*Primary Examiner*—Marvin M. Lateef
*Assistant Examiner*—Shawna J. Shaw
*Attorney, Agent, or Firm*—Workman, Nydegger & Seeley

[57] ABSTRACT

A magnetic field source movable type phantom head has a vessel filled with physiologic saline. The vessel preferably has an inner contour corresponding to an outer contour of a cerebrum of a patient to be tested. An electrode support tube has electrodes at one end. The electrodes are arranged within the vessel and movable at least in a vertical direction toward a center of the vessel as guided by a guiding and fixing device which guides the electrode support tube in a liquid tight fashion and fixes at a predetermined position. A position of the electrode support tube is measured to determine a position of the magnetic field source in the vessel.

10 Claims, 4 Drawing Sheets

MAGNETIC FIELD SOURCE MOVABLE PHANTOM HEAD

BACKGROUND OF THE INVENTION

FIELD OF THE INVENTION

The present invention relates generally to a magnetic field source movable phantom head. More specifically, the invention relates to a magnetic field source movable phantom head for checking accuracy of measurement of a generation source of a magnetic field.

DESCRIPTION OF THE RELATED ART

In the recent years, it has been utilized in a medical field to perform prediction or the like of an abnormal portion of a cerebrum of an epileptic by measuring variation of a magnetic field due to a bioelectric current and obtaining a record of the magnetic field as magnetoencephalography (MEG).

However, it is difficult to arithmetically solve a problem in presuming an active portion in a brain on the basis of data of measured magnetic field variation due to a bioelectric current (hereinafter referred to as "MEG measurement") with high strictness. Furthermore, for possibility of containing various error factors, such as magnetic noise or the like, it is not easy to presume the active portion from the measured MEG data with high precision. Therefore, various methods have been considered.

As one of such methods, there is a proposal to prepare a phantom head of a spherical model simulating a head portion of a patient to be tested, and utilize the phantom head in which one or more fixed electrodes are arranged within the sphericalmodel. A given current is supplied to the fixed Aelectrodes to perform MEG measurement and allowing the MEG measurement to be used for calibrating an actually performed MEG measurement for the patient to be tested.

However, in such a conventional phantom head, because of simple spherical configuration of the model, and fixed arrangement of the electrodes, a problem is encountered in that difference of accuracy caused in the shallow portion and the deep portion in the brain cannot be judged. Namely, it is not possible to know variation of the magnitude of the generated magnetic field depending upon depth of the magnetic field source in the brain. Therefore, the result of MEG measurement done with respect to the conventional phantom head is not sufficient for-calibrating the actual MEG measurement.

Furthermore, since an actual brain is not spherical, errors caused due to difference of shapes can not be verified.

SUMMARY OF THE INVENTION

It is therefore an object of the present invention to provide a magnetic field source movable type phantom head which can solve the problems set forth above, can measure difference of variation of a magnetic field due to variation of depth, and can verify how accurately to measure a generation source of the magnetic field.

Another object of the present invention is to provide a magnetic field source movable phantom head which can verify presumptive errors under a condition closer to the condition of a human brain.

A further object of the present invention is to provide a magnetic field source movable phantom head which can verify the degree of special resolution by arranging a plurality of electrodes to move in close less than or equal to 1 mm.

In a first aspect of the present invention, there is provided a magnetic field source movable type phantom head comprising:

a vessel to be filled with physiologic saline;

an electrode support tube disposed electrodes at one end thereof and being movable at least in a vertical direction toward a center of the vessel;

guiding and fixing means for guiding the electrode support tube in a liquid tight fashion and fixing the latter at a predetermined position; and measuring means for measuring a shifted position of the electrode support tube.

In a second aspect of the present invention, there is provided a magnetic field source movable type phantom head comprising:

a vessel to be filled with a physiologic saline;

a support supporting the vessel;

a first electrode support tube disposed first electrodes at one end thereof and being movable at least in vertical direction toward a center of the vessel;

first guiding and fixing means for guiding the first electrode support tube in a liquid tight fashion and fixing the latter at a predetermined position;

first measuring means for measuring a shifted position of the first electrode support tube;

a second electrode support tube disposed second electrode at one end thereof, located with a given distance may form the first electrode support tube, and being movable in a vertical direction and rotatable;

second guiding and fixing means for guiding the first electrode support tube in a liquid tight fashion and fixing the latter at a predetermined position; and second measuring means for measuring a shifted position and a rotational angle of the second electrode support tube.

Here, the vessel may have an inner contour corresponding to an outer contour of a cerebrum of a patient to be tested.

The vessel having the inner contour may be formed of light curing resin by a photo-imaging method on the basis of a magnetic resonance imaging measurement data of the patient to be tested.

The second electrode support tube may have a bent configuration so that the second electrodes approach to the first electrode as close as less than or equal to 1 mm in distance, when the second electrode support tube is rotated over a predetermined angle.

The second electrode support tube may be of a crank-like configuration.

The guiding and fixing means may comprise:

a cylindrical socket fixed to the vessel;

a Teflon cylindrical member with a flange, having one end inserted into the cylindrical socket and the other end provided threaded projections displaceable radially;

a sealing ring arranged between the cylindrical socket and the flange; and threaded fastening member threadingly engaging with the threaded projections.

The measuring means may comprise a transparent tube, through which the support tube passes, the transparent tube being provided with calibration on the circumferential portion thereof.

In a third aspect of the present invention, there is provided a magnetic field source movable type phantom head for magnetoencephalographic measurement, comprising:

cerebrum simulating space defining means for defining an internal space having a configuration corresponding to a cerebrum of a patient to be tested, the internal space being filled with physiologic saline;

electrodes movably disposed within the internal space;

electrode position detecting means for detecting a position of the electrodes within the internal space.

In a fourth aspect of the present invention, there is provided a magnetic field source movable type phantom head for magnetoencephalographic measurement, comprising:

cerebrum simulating space defining means for defining an internal space having a configuration corresponding to a cerebrum of a patient to be tested, the internal space being filled with physiologic saline;

first electrodes movably disposed within the internal space;

first electrode position detecting means for detecting a position of the first electrodes within the internal space;

second electrodes movably disposed within the internal space and relative to the first electrodes;

second electrode position detecting means for detecting position of the second electrodes within the internal space.

The second electrodes may be linearly movable in a vertical direction and rotatable for movement toward and away from the first electrodes.

The second electrodes may be located close proximity to the first electrodes at a predetermined angular position.

The second electrodes can be located with a distance less than or equal to 1 mm to the first electrodes at the predetermined angular position.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1:
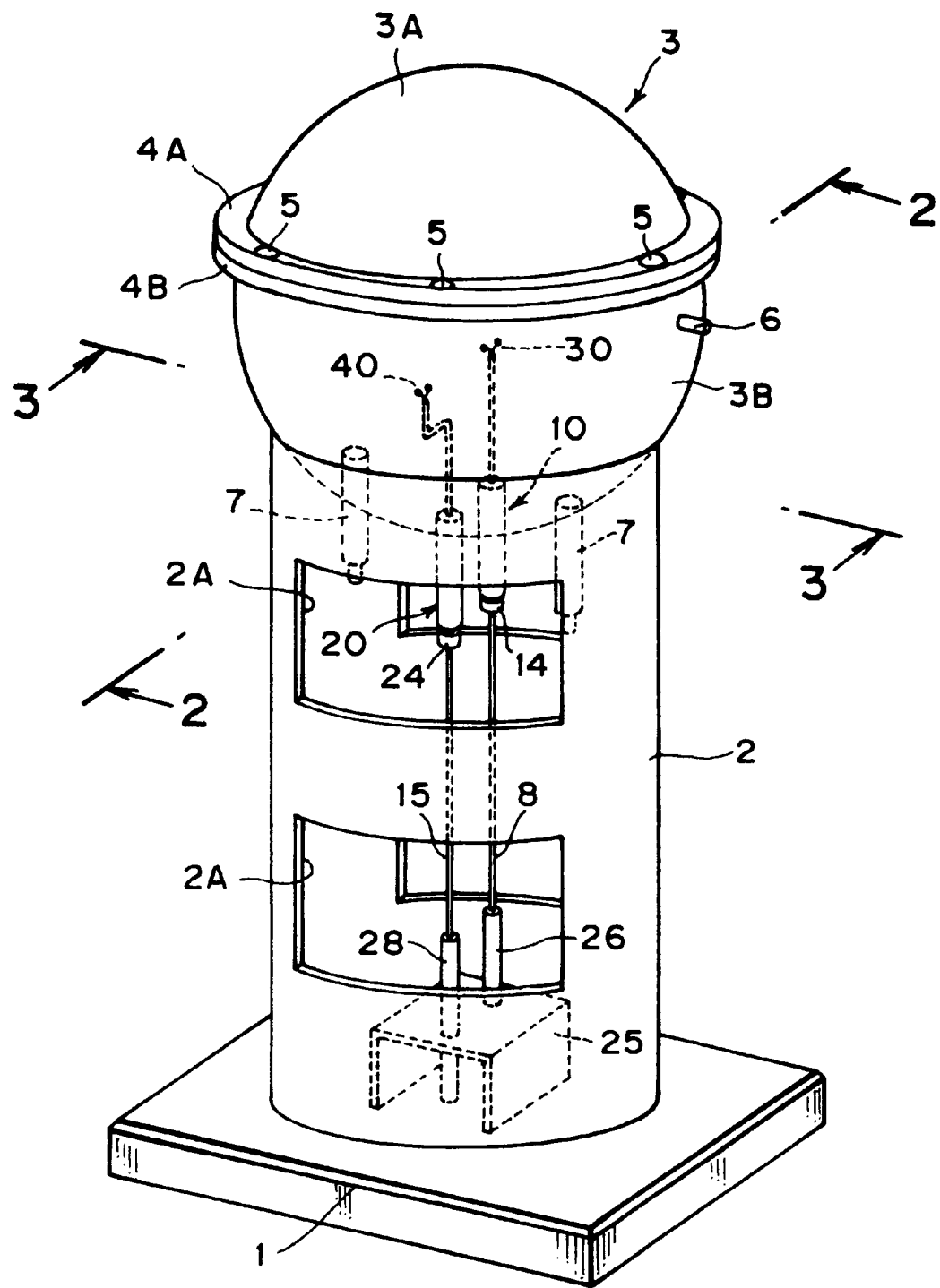
FIG. 1 is a perspective view showing one embodiment of a magnetic field source movable phantom head according to the present invention.
Figure 2:
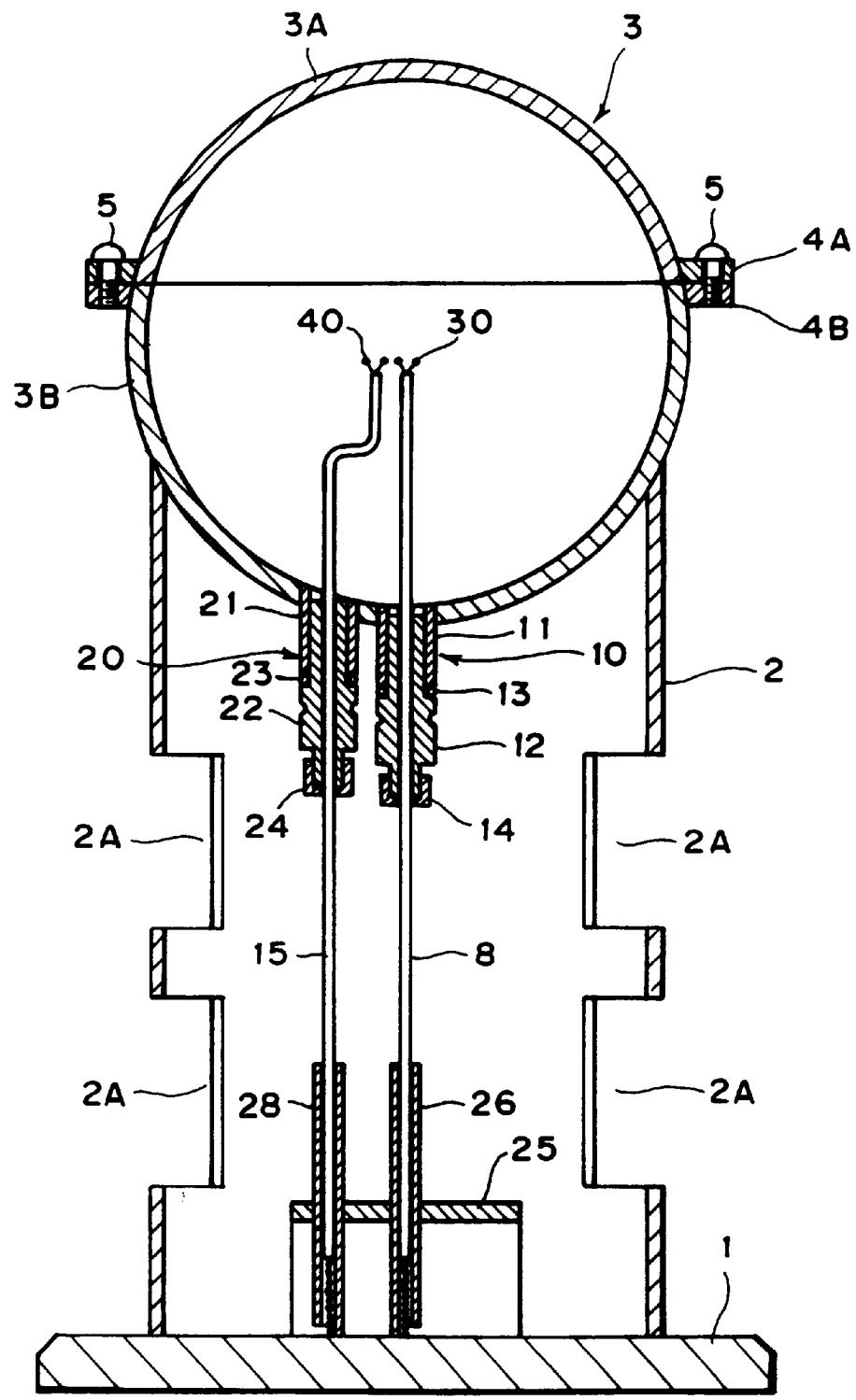
FIG. 2 is a section taken along line 2—2 of FIG. 1.
Figure 3:
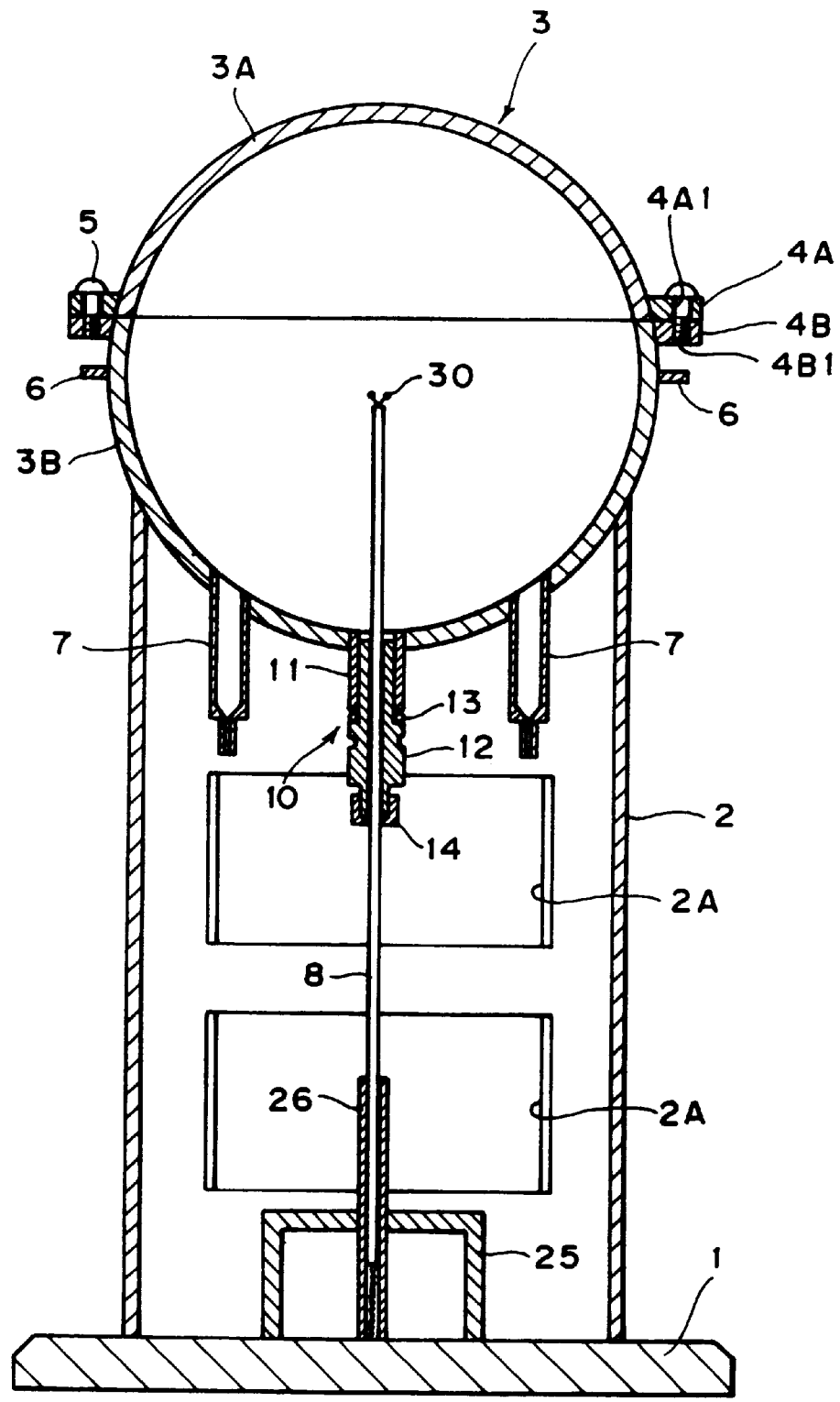
FIG. 3 is a section taken along line 3—3 of FIG. 1.

In FIG. 1, reference numeral 1 denotes a base plate formed of a transparent resin. 2 denotes a cross-sectionally circular support cylinder as a support supporting a vessel 3, which support cylinder 2 is formed of a transparent resin similarly to the base plate 1. The support cylinder 2 is formed with a plurality of opening portions 2A for facilitating operation described later.

The vessel 3 is arranged at an upper portion of the support cylinder 2. The shown vessel is an example of spherical vessel. In the shown case, the spherical vessel 3 is formed by an upper vessel 3A and a lower vessel 3B separated at a position offset from a center line of a spherical core. The upper and lower vessels 3A and 3B are integrally or separately formed with upper and lower flanges 4A and 4B, respectively. Through the upper and lower flanges 4A and 4B, threaded holes 4A1 and 4B1 are formed respectively. As described later, by engaging screws 5, the upper and lower flanges 4A and 4B, and thus the upper and lower vessels 3A and 3B are integrally assembled. On the outer surface of the vessel 3, coordinate bars 6 are provided in a diameterically opposing relation across the center.

Here, while the vessel 3 may be formed simply in a spherical configuration, of transparent resin, as shown, it is preferred that the vessel 3 is formed adapting to the configuration of a cerebrum of a patient to be tested by a photo-imaging method employing light or ultraviolet curing resin. Namely, at first, configurative information of the shape of a head portion including cerebrum of a patient to be tested is obtained by a magnetic resonance imaging (MRI) data. On the basis of the MRI data thus obtained, vessel 3 having at least an internal contour corresponding to an outer contour of the cerebrum is formed of the ultraviolet curing resin by a photo-imaging method. It should be noted that the vessel 3 thus obtained is merely becomes a substantially spheroidal configuration. The explanation given above and below are applicable as is.

Reference numerals 7, 7 each denotes a sealable nozzle for filling physiological saline or isotonic sodium chloride solution within the vessel 3, which are formed of the same material as the vessel.

Figure 4:
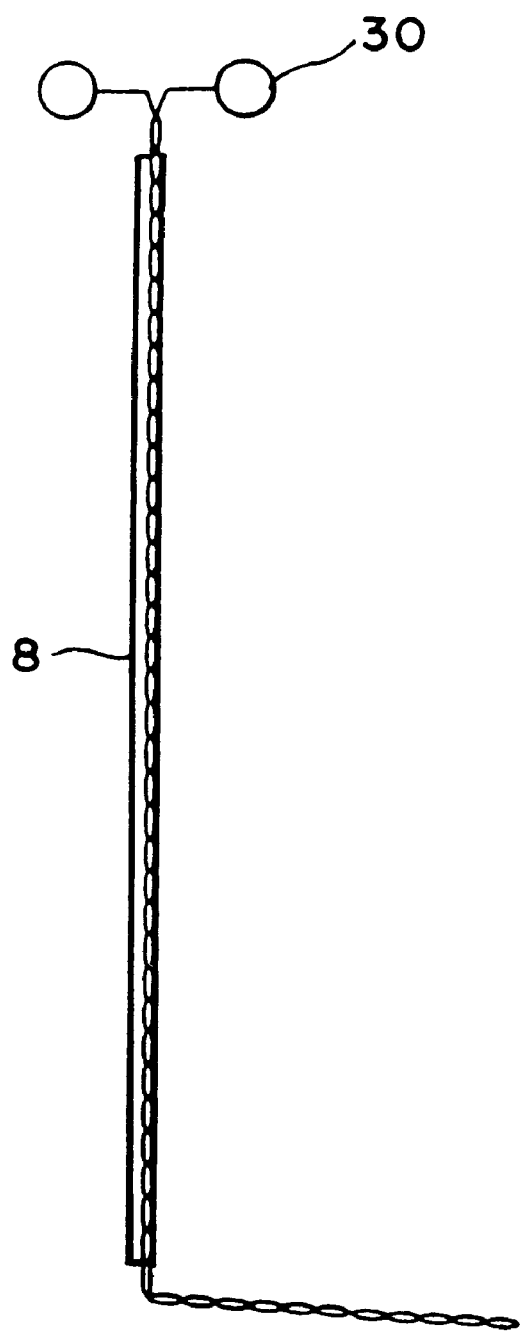
FIG. 4 is a side elevation showing a glass tube and an electrode in the embodiment of the present invention.

Reference numeral 8 denotes a first glass tube at one end of which a first electrode discussed below is disposed. The first glass tube 8 serves as a first electrode supporting tube and is provided at least vertically movably (also rotatably) toward the center of the vessel 3. Through the first glass tube 8 are inserted electrical wires, as shown in detail in FIG. 4. At the upper of the first glass tube, a pair of electrodes 30 are held with a distance of approximately 10 mm to be exposed to the interior space. Each of the electrodes 30 is a brass ball having a diameter of approximately 2 mm with the surface of the brass ball being gilded.

Reference numeral 10 denotes a first guiding and fixing means for guiding the first glass tube with liquid tight seal and fixing the latter at a predetermined position. The first guiding and fixing means includes a cylindrical socket 11 secured to the lower center portion of the lower vessel 3B, a cylindrical member 12 made of Teflon (trademark) with a flange, being inserted into the cylindrical socket 11 at one end and having radially displaceable threaded projections extending from the other end, a sealing ring (O-ring) 13 arranged between the cylindrical socket 11 and the flange, and a fastening nut 14 engaging with the threaded projections.

Reference numeral 15 denotes a second glass tube as a second electrode supporting tube. Second electrodes 40 discussed below are arranged at one end of the second glass tube 15. The second glass tube 15 is arranged vertically movably and rotatably with a given distance away from the first glass tube 8 as the first electrode supporting tube. The second glass tube 15 is bent in the crank-like shape at one end such that when the second glass tube 15 is rotated over a predetermined angle the second electrodes 40 may approach the first electrodes 30 by a distance less than or equal to 1 mm (see FIG. 1). The second glass tube 15 has the same basic components as the first glass tube 8 except that the one end portion is bent in crank-like shape. As set forth above, electrical wires are disposed through the second glass tube 15 and the pair of second electrodes 40 are exposed from the one end of the second glass tube with a distance of approximately 10 mm. The electrodes 40 are also of a brass ball having a diameter of approximately 2 mm, the surface of the brass ball is also gilded.

Reference numeral 20 denotes a second guiding and fixing means for guiding the second glass tube 15 in a liquid tight fashion and fixing the latter at a predetermined position. The second guiding and fixing means 20 has the same components as the first glass guiding and fixing means 10 and is only differentiated in the mounting position of a cylindrical socket fixed to the lower vessel 3B. Accordingly, the second guiding and fixing means 20 has a cylindrical socket 21, a cylindrical member 22 made of Teflon (trademark), having a flange, inserted the one end into the cylindrical socket 21 and having radially displaceable threaded projections, a sealing ring (O-ring) 23 arranged between the cylindrical socket 21 and the flange, and a fastening nut 24 engageable with threaded projections.

Reference numeral 25 denotes a support base of essentially channel-shaped cross section, which is rigidly secured on the base plate 1. The support base 25 vertically supports first and second transparent scale tubes 26 and 28 serving as first and second measuring means, respectively. A calibrated or graduated seal is fitted on the outer periphery of the first and second scale tubes 26 and 28, respectively. The first and second glass tubes 8 and 15 are respectively inserted into the first and second scale tubes 26 and 28. The calibration is provided in such a manner that the position of the first and second glass tubes 8 and 15 can be directly read with a precision of 0.2 degree in the rotational direction and 0.1 mm in the vertical direction.

As set forth above, the vessel 3, in which the upper and lower vessels 3A and 3B are formed separately from each other, is placed upside down after respective flanges 4A and 4B are coupled and then the screws 5 are engaged to the threaded holes 4A1 and 4B1. Then, the physiologic saline is filled through the nozzle 7, and then sealed. Thereafter, the vessel 3 is mounted on the support cylinder 2.

Thus, the first and second glass tubes 8 and 15 are placed at respective desired positions by releasing the fastening nuts 14 and 24 and shifting in the rotating direction and/or in the vertical direction for a given magnitude and then fixed by tightening up the fastening nuts 14 and 24.

As a result, the first electrodes 30 extending through the center of the vessel 3 can be varied the vertical position accurately and easily. Also, by rotating the first glass tube 8, a direction of current by the first electrodes, namely orientation of a line of magnetic force can be varied.

By performing MEG measurement with supplying a predetermined current to the first electrodes 30 and varying the vertical position of the first electrodes, the MEG measured value depending upon the vertical position, i.e. depth of the magnetic field source can be obtained. By this, it becomes possible to accurately presume the generation source of the magnetic field by comparison of the MEG measured value thus obtained with the actual MEG measured value of the patient to be tested.

It should be noted that when the simple spherical vessel 3 is employed, the magnetic fields may interfere with each other to cause cancellation at the center of the sphere, making MEG measurement impossible. However, in the vessel 3 which has an inner contour adapted to the shape of cerebrum of the patient to be tested, such problem will not be arisen.

On the other hand, by rotating the second glass tube 15 to position the first electrodes 30 and the second electrodes 40 in quite close proximity to each other (to have a distance less than or equal to 1 mm), and by supplying predetermined equal current to both electrodes, the magnetic field sources located quite close proximity to each other can be obtained. Accordingly, MEG measured values of respective closely located magnetic field sources can be obtained. By this, it becomes possible to verify the degree of spatial resolution of the MEG measurement device.

As set forth above, according to the present invention, since magnetic fields can be generated at a plurality of known positions set in similar condition to that of the human being, it becomes possible to verify spatial resolution of measurement accuracy which has been a significant problem in conventional MEG measurement. Therefore, it becomes possible to check accuracy of measurement employing the currently practiced spherical model, and also to utilize for verifying reliability of a more sophisticated presuming method which could be developed in the future. Therefore, the present invention may significantly contribute for the progress of MEG measurement technology.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A magnetic field source movable type phantom head comprising:

a vessel to be filled with a physiologic saline;

a support supporting said vessel;

a first electrode support tube provided with first electrodes at one end thereof and being movable at least in vertical direction toward a center of said vessel;

first guiding and fixing means for guiding said first electrode support tube in a liquid tight fashion and fixing the latter at a predetermined position;

first measuring means for measuring a shifted position of said first electrode support tube;

a second electrode support tube provided with second electrodes at one end thereof, located at a given distance away from said first electrode support tube, and being movable in a vertical direction and rotatable;

second guiding and fixing means for guiding said first electrode support tube in a liquid tight fashion and fixing the latter at a predetermined position; and second measuring means for measuring a shifted position and a rotational angle of said second electrode support tube.

2. A magnetic field source movable type phantom head as claimed in claim 1, wherein said vessel has an inner contour corresponding to an outer contour of a cerebrum of a patient to be tested.

3. A magnetic field source movable type phantom head as claimed in claim 2, wherein said vessel having said inner contour is formed of light curing resin by a photo-imaging method on the basis of a magnetic resonance imaging measurement data of the patient to be tested.

4. A magnetic field source movable type phantom head as claimed in claim 1, wherein said second electrode support tube has a bent configuration so that said second electrodes approach to said first electrode as close as less than or equal to 1 mm in distance, when said second electrode support tube is rotated over a predetermined angle.

5. A magnetic field source movable type phantom head as claimed in claim 4, wherein said second electrode support tube is of a crank-like configuration.

6. A magnetic field source movable type phantom head for magnetoencephalographic measurement, comprising:

cerebrum simulating space defining means for defining an internal space having a configuration corresponding to a cerebrum of a patient to be tested, said internal space being filled with physiologic saline;

electrodes movably disposed within said internal space;

electrode position detecting means for detecting a position of said electrodes within said internal space.

7. A magnetic field source movable type phantom head for magnetoencephalographic measurement, comprising:

cerebrum simulating space defining means for defining an internal space having a configuration corresponding to a cerebrum of a patient to be tested, said internal space being filled with physiologic saline;

first electrodes movably disposed within said internal space;

first electrode position detecting means for detecting a position of said first electrodes within said internal space;

second electrodes movably disposed within said internal space and relative to said first electrodes;

second electrode position detecting means for detecting position of said second electrodes within said internal space.

8. A magnetic field source movable type phantom head as claimed in claim 7, wherein said second electrodes are linearly movable in a vertical direction and rotatable for movement toward and away from said first electrodes.

9. A magnetic field source movable type phantom head as claimed in claim 8, wherein said second electrodes are located close proximity to said first electrodes at a predetermined angular position.

10. A magnetic field source movable type phantom head as claimed in claim 9, wherein said second electrodes can be located with a distance less than or equal to 1 mm to said first electrodes at said predetermined angular position.

* * * * *

UNITED STATES PATENT AND TRADEMARK OFFICE
CERTIFICATE OF CORRECTION

Page 1 of 2

PATENT NO. : 5,938,598
DATED : Aug. 17, 1999
INVENTOR(S) : Tsunehiro Takeda; Hiroshi Endo; Toru Kumagai It is certified that error appears in the above-identified patent and that said Letters Patent is hereby corrected as shown below:

Col. 1, line 33, after "the" change "sphericalmodel" to --spherical model--

Col. 1, line 34, before "to" change "Aelectrodes" to --electrodes--

Col. 1, line 66, after "in" and "close" insert --as--

Col. 2, line 5, after "tube" insert a comma

Col. 2, line 20, after "tube" insert a comma

Col. 3, line 29, after "located" insert --in--

Col. 3, line 62, after "other" change "instance" to --instances--

Col. 3, line 64, before "the" change "obscure" to --obscuring--

Col. 4, line 31, after "obtained" delete --is--

Col. 4, line 32, after "The" change "explanation" to --explanations--

Col. 4, line 35, after "each" change "denotes" to --denote--

Col. 6, line 6, after "such" insert --a--

Col. 6, line 7, change "be arisen" to --arise--

Col. 6, line 13, after "located" insert --in--

UNITED STATES PATENT AND TRADEMARK OFFICE
CERTIFICATE OF CORRECTION

PATENT NO. : 5,938,598

DATED : Aug. 17, 1999

INVENTOR(S) : Tsunehiro Takeda; Hiroshi Endo; Toru Kumagai

It is certified that error appears in the above-identified patent and that said Letters Patent is hereby corrected as shown below:

Col. 6, line 27, after "contribute" change "for" to --to--

Col. 8, line 21, after "located" insert --in--

Signed and Sealed this

Eighth Day of August, 2000

Attest:

*Attesting Officer*

Q. TODD DICKINSON

*Director of Patents and Trademarks*